Patented Mar. 10, 1931

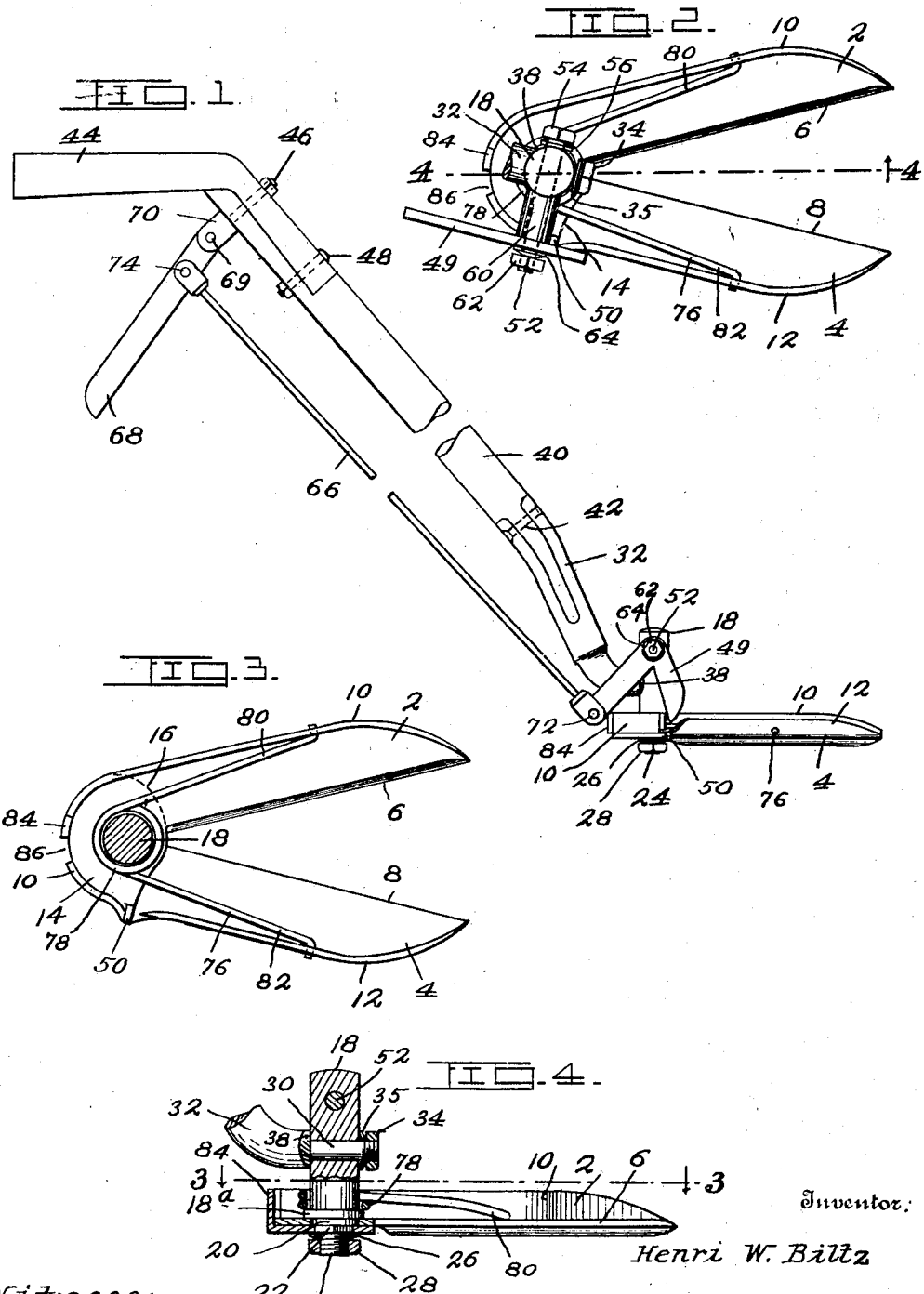

1,795,421

UNITED STATES PATENT OFFICE

HENRI W. BILTZ, OF KANSAS CITY, MISSOURI

GRASS TRIMMER

Application filed August 8, 1929. Serial No. 384,413.

My invention relates to tools for trimming grass and other vegetation along the edges of sidewalks, flower beds and other places where a lawnmower cannot be used to advantage, and one object is to provide a tool of this character which can be used in a standing position so that it will not be necessary for the operator to work in a stooped position as when the ordinary hand sickle or grass hook is employed.

A further object is to provide a tool of this character which is not only a labor saver but which may be manufactured at low cost and will prove durable and efficient in use.

In order that the invention may be fully understood, reference will now be had to the accompanying drawing, in which:

Fig. 1 is a broken side elevation of the tool.

Fig. 2 is a plan view of the tool with the staff and handle broken away.

Fig. 3 is a horizontal section on line 3—3 of Fig. 4.

Fig. 4 is a longitudinal section on line 4—4 of Fig. 2.

In carrying out the invention I provide an oscillatory blade 2 and a stationary blade 4 having cutting edges 6 and 8 along their adjacent edges, and reinforcing flanges 10 and 12, respectively. The rear portion of the oscillatory blade 2 has a lateral extension 14 which overlaps the rear portion of the stationary blade 4, while the latter is provided at its rear portion with a lateral extension 16 which underlies the rear portion of the blade 2.

The blades 2 and 4 are mounted upon a shaft 18 provided at its lower portion with a peripheral shoulder 18a, a short circular portion 20 arranged beneath the shoulder 18a, a short rectangular portion 22 arranged beneath the circular portion 20, and a threaded lower end 24 arranged beneath the rectangular portion 22. The short circular portion 20 provides a journal on which the blade 2 is operably mounted, while the rectangular portion 22 extends through a complemental opening in the blade 4 and holds the latter stationary upon the shaft 18. The threaded end 24 of the shaft 18 is provided with a spring washer 26 and a nut 28 which latter, on being tightened, draws the shoulder 18a down upon the movable blade 2 and forces the washer 26 against the under side of the stationary blade 4, thereby holding the two blades in contact with each other so that they may prove efficient in cutting grass and other vegetation.

The shaft 18 is removably connected to the reduced lower end 30 of a tang 32 by suitable means such as a nut 34 and a spring washer 35. By tightening the nut 34 the washer 35 is pressed against the forward portion of the shaft 18 while a shoulder 38 on the tang is drawn against the rear portion of said shaft 18 thereby firmly securing the latter and the tang together. The tang 32 is bifurcated at its upper portion and secured to the lower end of a staff 40 by suitable means such as a rivet 42. The upper end of the staff 40 is provided with a handle 44 secured in place by suitable means such as bolts 46 and 48.

The movable blade 2 is swung towards the blade 4 by a bell-crank lever 49 the forward end of which is adapted to push backwardly upon a lug 50 turned upwardly from the adjacent portion of the lateral extension 14. The lever 49 is operably mounted upon a bolt 52 extending laterally through the upper portion of the shaft 18 to which it is secured by suitable means such as a nut 54 and a spring washer 56. A spacing sleeve 60 is interposed between the shaft 18 and the lever 49, which latter is secured upon the bolt 52 by means of a nut 62 and a washer 64.

The lever 49 is actuated by a connecting rod 66 which in turn is operated by a hand lever 68 fulcrumed on a pin 69 in the enlarged bifurcated head 70 of the bolt 46. The connecting rod 66 is operably connected at its lower end by a pivot 72 to the rear arm of the lever 49 and at its upper end by a pivot 74 to the lever 68.

Normally the blades 2 and 4 are held in open position by a spring 76 consisting of one or more coils 78 and arms 80 and 82, the forward ends of which latter extend through holes in the flanges 10 and 12, respectively.

The opening and closing movements of the blades 2 and 4 are limited by a stop 84 turned upwardly from the rear portion of the stationary blade 4 into a recess 86 formed by cutting away a portion of the flange 10 on the blade 2.

In operating the tool the blades are pushed forwardly upon the ground and the movable blade 2 is alternately opened and closed by the spring 76 and proper manipulation of the hand lever 68.

From the foregoing description it is apparent that I have provided a tool embodying the advantages above pointed out, and while I have shown and described one form of the invention I reserve all rights to such other forms and modifications as properly fall within the spirit and scope of the invention as claimed.

Having thus described my invention, what I claim and desire to secure by Letters Patent, is:

A tool of the character described consisting of two blades having marginal flanges, a shaft upon which said blades are mounted, a spring having convolutions extending around said shaft and arms extending from said convolutions and engaging said flanges to hold the blades in open position, a lug on one of the blades, a bell-crank lever operably associated with said shaft and engaging the lug to close the last mentioned blade against the companion blade, a connecting rod for actuating said bell-crank lever, a hand lever for actuating said connecting rod, and a staff secured to the shaft and upon which said hand lever is mounted.

In testimony whereof I affix my signature.

HENRI W. BILTZ.